Jan. 23, 1923. 1,442,980.
R. SHEDENHELM.
SELF LOADING AND DISTRIBUTING WAGON.
FILED OCT. 16, 1917.
5 SHEETS—SHEET 4.
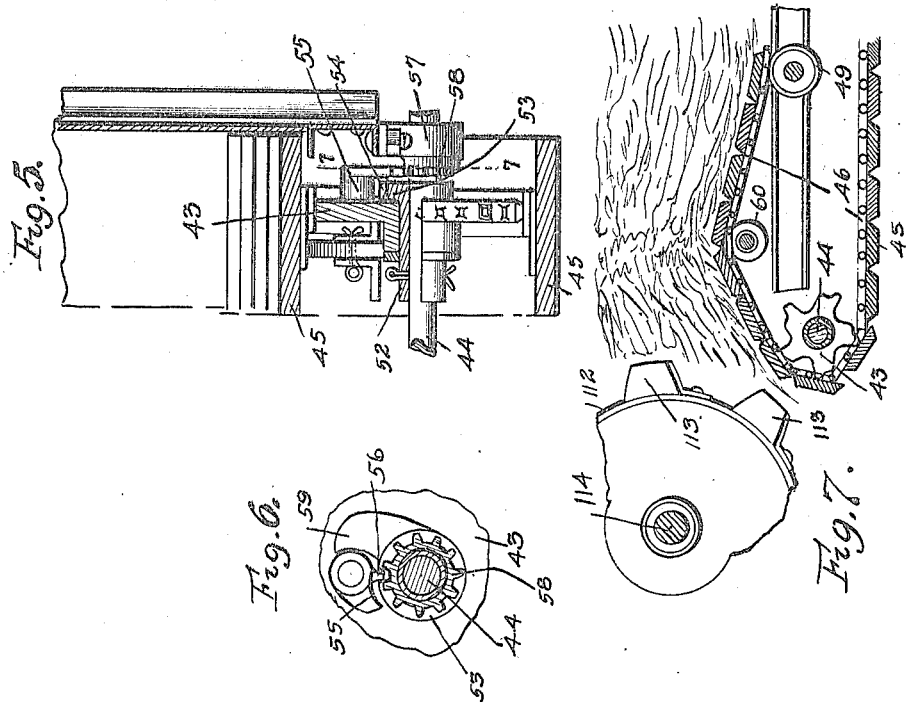
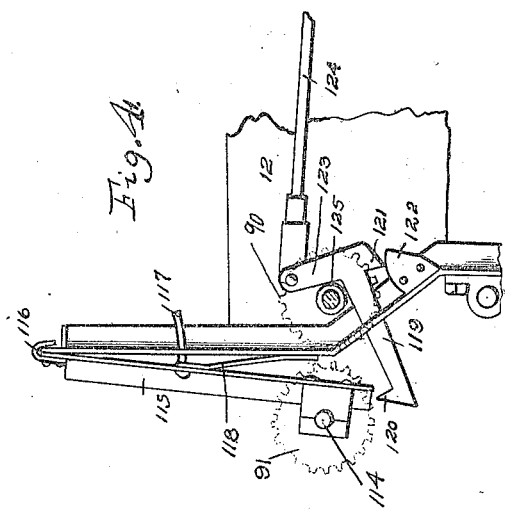
Inventor
Robert Shedenhelm
by Craig & Bair attys

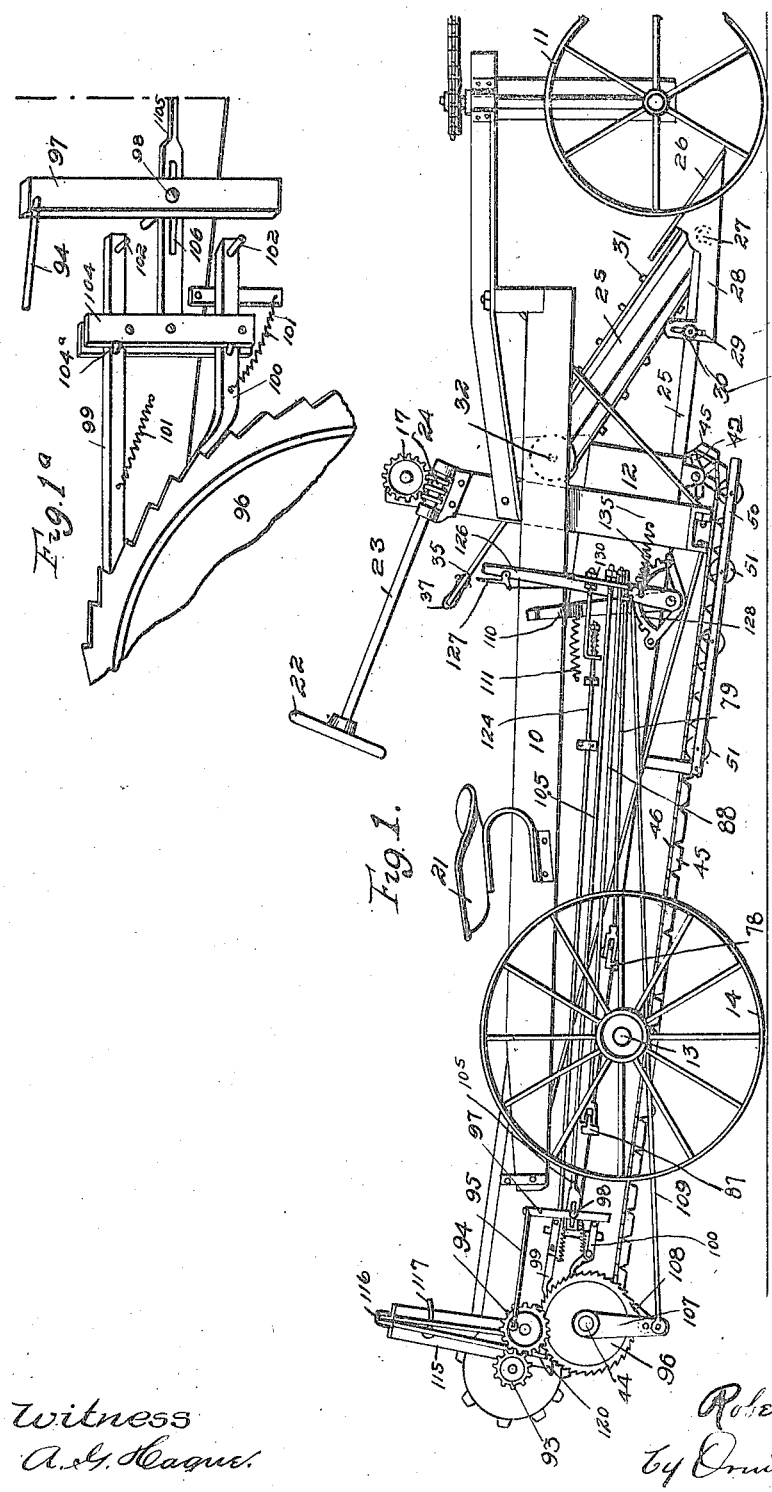

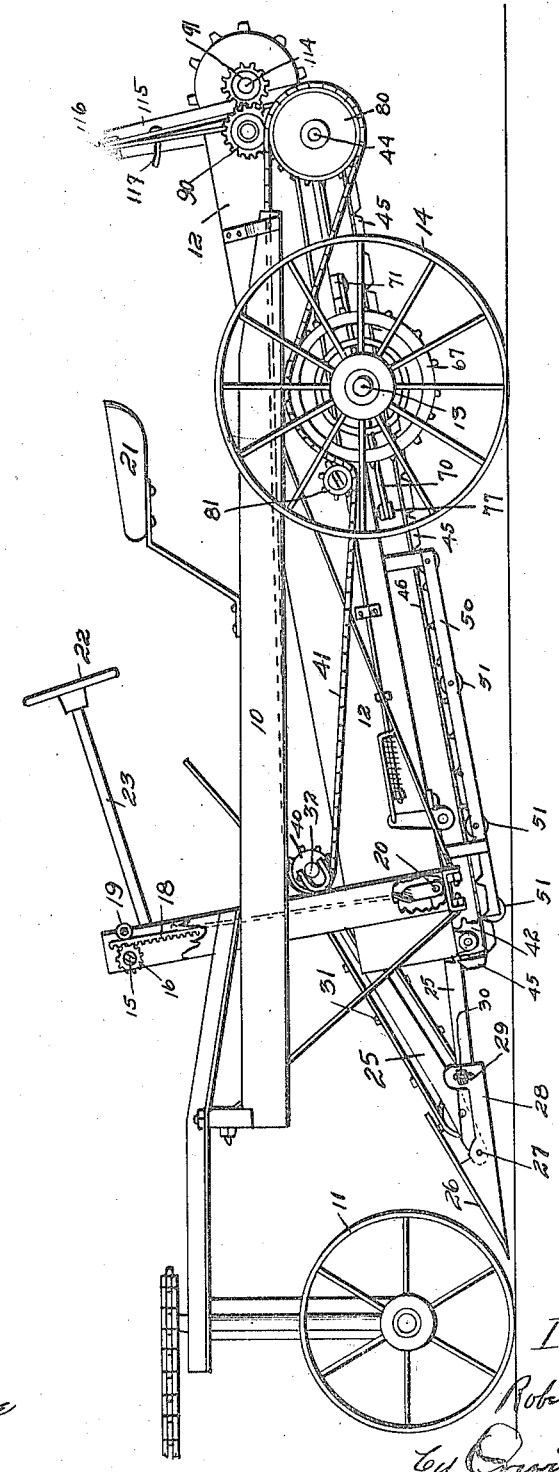

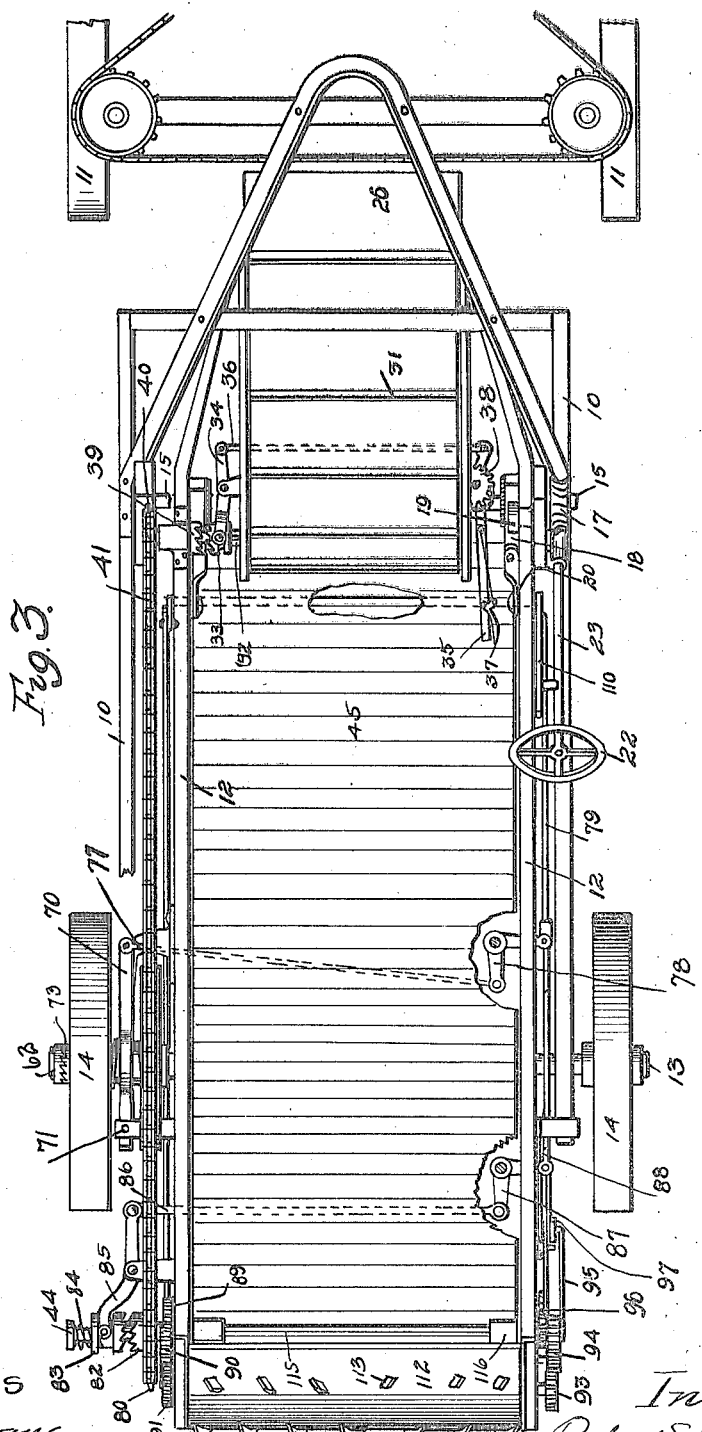

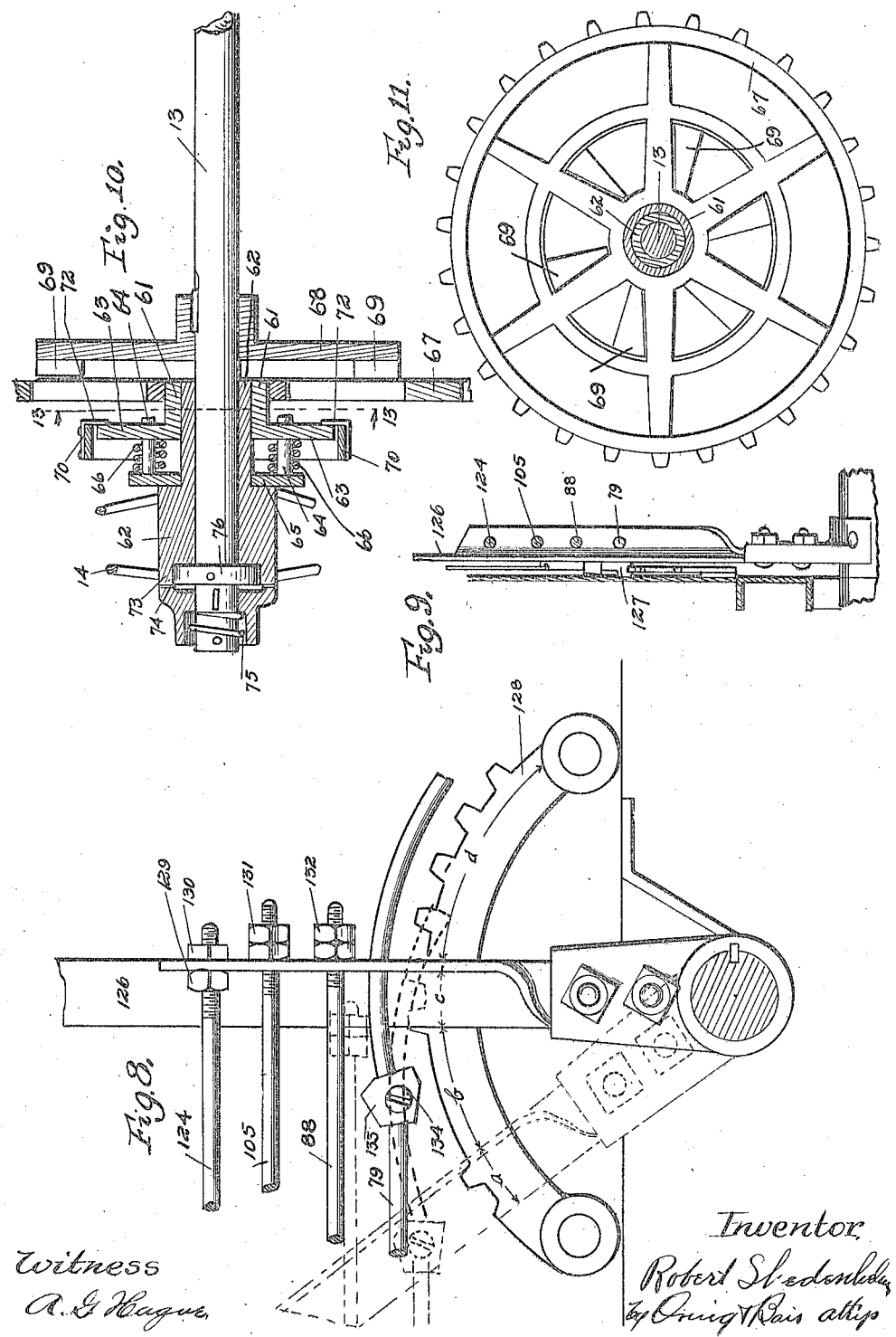

Patented Jan. 23, 1923.

1,442,980

UNITED STATES PATENT OFFICE.

ROBERT SHEDENHELM, OF GRINNELL, IOWA.

SELF LOADING AND DISTRIBUTING WAGON.

Application filed October 16, 1917. Serial No. 196,952.

*To all whom it may concern:*

Be it known that I, ROBERT SHEDENHELM, a citizen of the United States, and resident of Grinnell, in the county of Poweshiek and State of Iowa, have invented a certain new and useful Self Loading and Distributing Wagon, of which the following is a specification.

My invention relates to and consists in, certain improvements in machines for loading and distributing material, of the class illustrated in my Patent Number 1,226,125, issued May 15, 1917, and which comprises essentially a wagon bed supported on wheels, having a movable apron in the bottom of the wagon bed, and a spreader at the rear of the wagon bed, and also having at the front of the wagon bed a material cutting blade and a conveyor running from the cutting blade to the front end of the apron in the wagon bed, together with means for raising and lowering the front end of the wagon bed to thereby move the cutting blade from position where it will enter the surface over which the wagon bed is advancing, for loading purposes, and elevate it so that the cutting blade will be out of contact with the surface when transporting material to a place of discharge.

The objects of my invention are to provide controlling means of simple construction, whereby the operator may readily, easily and quickly control all of the operative parts of the device, and further in this connection to provide a controlling means in which there are a minimum number of levers for effecting the various operations, and further in which the main controlling lever is so arranged and combined with the various operative parts that when said lever is moved to its various positions the operative parts will be controlled to operate in proper sequence to each other, whereby it is made impossible for the operator to set the various operative parts of the device for simultaneous operation in cases where such operation might tend to break the machine or to cause various operative parts to work on the material in opposition to each other, and further whereby the convenience of the operator is facilitated, and whereby the proper operation of the machine for the various purposes for which it is intended may be readily and easily learned by an unskilled operator in a short time.

A further object is to provide in a device of the character named, a means whereby the apron in the bottom of the wagon bed may be advanced by power derived from one of the supporting or traction wheels or other power, or at times by power applied to a manually controlled lever.

In a device of this character it is important that the apron in the bottom of the wagon bed be supported on rollers or anti-friction devices in such a manner that it will move very freely with a load on it. One of the objects of my present invention is to provide means for automatically holding the apron against rearward movement that would tend to discharge its load at all times except when the apron is driven by suitable power, to thereby avoid the possibility of having a load discharged by gravity when the machine is traveling up-hill or when being started.

A further object is to provide an improved spreader of simple, durable and inexpensive construction, so arranged that the material delivered thereby may be spread over an area materially wider than the width of the spreader, and in an even and uniform manner throughout the entire width.

A further object is to provide improved means for raising and lowering the front end of the wagon bed relative to the main frame, which means is so arranged that the operator may readily, quickly and easily effect the desired adjustment, and also so arranged that the position of the cutter blade at the front of the wagon bed will be fixed relative to the main frame in any position of its adjustment.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of a spreading and loading device embodying my invention.

Figure 1ª shows a perspective view of the automatic ratchet device for advancing the apron.

Figure 2 shows a side elevation of a machine embodying my invention, taken from the side opposite that shown in Figure 1.

Figure 3 shows a top or plan view of same, parts being broken away to show structural details.

Figure 4 shows a side view of the spreader supporting frame and a part of the rear of the wagon box, for illustrating the means for supporting the spreader in an inoperative position, and also the means for moving it to and holding it in an operative position.

Figure 5 shows an enlarged, detail, sectional view of the rear apron driving shaft and connected parts, illustrating the means for locking the apron against rearward movement when the apron driving shaft is not being positively driven.

Figure 6 shows a sectional view on the line 7—7 of Figure 5.

Figure 7 shows a detail, sectional view of the rear end of the apron in the wagon bed and connected parts, illustrating the device for raising the rear end portion of the apron for the purpose of breaking up material supported thereby.

Figure 8 shows an enlarged, detail, side view of the main controlling lever with its connections, the dotted lines in the figure showing the lever moved rearwardly.

Figure 9 shows a rear elevation of same, the adjacent portion of the frame member being shown in section.

Figure 10 shows an enlarged, detail, sectional view, illustrating the left end of the rear axle and the spring actuated clutch and ratchet devices thereon for connecting and disconnecting the rear axle with the driving sprocket chain, and for operatively connecting the supporting wheel with the rear axle when the machine is moving forwardly.

Figure 11 shows a sectional view on the line 13—13 of Figure 10.

Referring to the accompanying drawings, I have used the reference numeral 10 to indicate the main frame of the machine, the front end of which is mounted on the supporting and steering wheels 11.

Connected with the main frame near its rear end, is a tilting wagon bed 12 mounted on a rear axle 13 to which the traction wheels 14 are fixed.

The means for raising and lowering the front end of the wagon bed relative to the main frame comprises a shaft 15 having pinions 16 thereon, and also having a worm gear 17 fixed thereto. Two rack bars 18 are held in mesh with the pinions 16 by the rollers 19, and their lower ends are connected to the front of the wagon bed at 20.

Mounted adjacent to the driver's seat 21 is a hand wheel 22 mounted on a shaft 23 provided with a worm 24 in mesh with the worm gear 17. By this arrangement a manipulation of the hand wheel in one direction will raise the front of the wagon bed and in another direction will lower it, but in any of these positions the front end of the wagon bed will be locked relative to the frame on account of the worm gear device.

Attached to the front end of the wagon bed is a frame 25 having at its forward end a cutting blade 26. This cutting blade is pivotally supported on the pin 27, and the rearward extension 28 of the cutting blade is provided with a slot 29 through which a bolt 30 is extended into the frame 25, thereby providing means for tilting the cutting blade relative to the frame 25 and holding it in its tilted position.

Between the cutting blade and the front of the wagon bed is a movable conveyor 31 arranged for operation in such manner that material moving up over the cutting blade will be carried by said conveyor into the front end of the wagon bed. The conveyor 31 may be used with or without the cutting blade 26, and especially may be used without said cutting blade with suitable conveyor devices for loading sand, or with suitable engaging fingers or the like for loading long manure. This conveyor is operated by a shaft 32 having thereon a clutch 33 slidingly and nonrotatably mounted. This clutch is controlled by a lever 34 connected to a hand lever 35 by means of the rod 36. This hand lever is provided with a pawl 37 to engage a sector 38 whereby it may be held in different positions of its adjustment.

Fixed to the shaft 32 is a clutch member 39 to coact with the clutch member 33, and fixed to the shaft 32 is a sprocket wheel 40 connected to a sprocket chain 41 hereinafter described, whereby said shaft may be rotated for driving the front conveyor. The apron in the bottom of the wagon bed is composed of sprocket chains and cross slats which sprocket chains travel around sprocket wheels at the front and rear ends of the wagon bed. At the front of the wagon bed the apron travels around the sprocket wheels 42 which are capable of free movement, and at the rear it travels around the sprocket wheels 43 which are driven through the rear apron shaft 44 in a manner to be hereinafter more fully described.

The apron slats indicated by the numeral 45 are of the ordinary construction with the adjacent edges of two slats beveled or inclined in a direction with the parts thereof adjacent to the chains close together, and the parts thereof spaced from the chains, as shown in Figure 7.

In order that the apron may move freely and be supported in a relatively flat position at the bottom of the wagon bed, I provide a series of anti-friction rollers 49 (see Figure 7) to support the part thereof that constitutes the bottom of the wagon bed, and I have also provided a frame 50 provided with rollers 51 for supporting the front end of that part of the apron that is below the bottom of the wagon bed.

I have provided an improved means for automatically locking the apron against rearward movement in the wagon bed except at such times as the apron is positively driven through the driving shaft 44. This device comprises a collar 52 keyed to the shaft 44 and having a disc 53 at one end provided with a notch 54 in its periphery. Mounted on the sprocket wheel 43 is a pawl 55 having a tooth 56 designed to enter the notch 54. A stationary bearing member 57 is fixed to the frame and has the shaft 44 rotatably mounted in it. This bearing is provided on its inner end with a series of teeth 58 in position to be engaged by the said pawl 55. The said disc 53 is provided with an arm 59 to engage the pawl 55, as shown in Figure 5. By means of this arrangement, and assuming that the shaft 44 is being rotated to advance the apron, it will be obvious that the disc 53, the arm 59 and the pawl 55 will all rotate in unison and the pawl 55 will be held in the position shown in Figure 5 out of engagement with the teeth 58.

Assuming, however, that the shaft 44 is not being driven, and also assuming further that the apron is carrying a heavy load and the wagon bed is tilted rearwardly, the anti-friction devices supporting the apron will permit the apron to move of its own accord without being driven by the shaft. When this occurs the sprocket chains of the apron move the sprocket wheels 43 a slight distance, whereupon the tooth 56 tends to move with the sprocket wheel but is held against any material movement on account of being in the notch 54 which is fixed to the shaft 44. This will cause the pawl 55 to be tilted until it engages the adjacent tooth 58 of the stationary bearing 57, thereby positively locking the apron against further movement. At any time after this that the shaft 44 is rotated, the first effect of said movement will be to rotate the disc 53 slightly relative to the sprocket 43, whereupon the tooth 56 in the notch 54 will tilt the pawl 55 to the position shown in Figure 5, whereupon the sprocket wheel 43 will be free to rotate in the ordinary manner.

Another improvement I have provided in connection with this apron is that at the rear end of the apron I have provided a roller 60 arranged in a plane above the supporting rollers 49 so that at the rear end the apron traveling over the roller 60 will be inclined sharply upwardly. This tends to break up any matted manure or other material that is being supported on the apron.

The means for driving the various driven parts of the device by power from the traction wheels comprises a collar 61 slidingly mounted upon the hub 62 of the traction wheel 14. This collar has an outwardly extending flange 63, and this flange has a number of pins 64 extending through it and fixed at their outer ends to a stationary collar 65 on the hub 62. Between the collar 65 and the flange 63 are extensible coil springs 66, and on the pins 64, tending to move the collar 61 inwardly. Rotatably mounted on this collar 61 is the large sprocket wheel 67. Fixed to the shaft 13 adjacent the inner face of the large sprocket wheel 67 is a disc 68 having outwardly extended lugs 69 designed to cooperate with the spokes of the large sprocket wheel 67. For controlling the movement of the collar 61, I have provided a lever 70 fulcrumed at its rear end at 71. This lever is made of two parts which extend respectively above and below the flange 63, and the lever is provided with lugs 72 to engage the inner face of the flange 63.

From this arrangement it is obvious that when the lever 70 is moved in one direction, it will compress the spring 66 and move the sprocket wheel 67 out of engagement with the lugs 69 on the disc 68, so that the driving wheel 14 may rotate without rotating the large sprocket wheel 67. However, when the pressure on the lever 70 is released, then the springs 66 move the sprocket wheel 67 inwardly to position where it is engaged by the lugs 69 of the disc 68, so that the sprocket wheel 67 will then be driven in unison with the traction wheel 14. In this connection, I have provided means whereby a rearward or backing movement of the machine will not operate the aprons, by providing a ratchet 73 on the outer end of the hub 62 to engage the corresponding ratchet 74 slidingly but nonrotatably mounted on the outer end of the shaft 13, which ratchet 74 is held by a spring 75 in an inward direction with the two ratchet surfaces in mesh. Longitudinal sliding movement of the hub 62 on the shaft 13 is prevented by the collar 76 fixed to the shaft 13 and inserted in an annular chamber formed on the interior of the hub 62. By means of this arrangement, the wheels 14 may rotate backwardly without driving the axle 13 or the large sprocket wheel 67.

The lever 70 is connected to a rod 77 which in turn connects to a bell crank lever 78. The opposite end of the bell crank lever 78 is connected to a rod 79 which is operated by the main controlling lever in the manner hereinafter described.

For driving the apron shaft 44 I have provided a sprocket wheel 80 rotatably mounted on the apron shaft and having the sprocket chain 41 passed around it. This chain 41 also passes over the top of the sprocket wheel 67 to which it is held by the idler sprocket 81.

For throwing the apron into and out of operation, I have provided on the sprocket wheel 80 a ratchet clutch 82 designed to coact with a sliding ratchet member 83 normally held by means of the spring 84 in position with the ratchet teeth engaging each other. A lever 85 is provided for holding the sliding ratchet member 83 outwardly, as shown in Figure 3, which lever is connected to a rod 86 which rod is also connected to a bell crank lever 87, and the bell crank lever is in turn connected to a rod 88 which is attached to the main operating lever in the manner hereinafter described. By this arrangement, the apron is normally driven when the chain 41 is moving in one direction, that is to say, with the top of the apron moving rearwardly. When, however, the ratchet device 83 is moved outwardly, the chain 41 may move without moving the shaft 44.

By the arrangement heretofore described, it will be seen that through the operation of the sprocket chain 41, the forward or elevating apron may be moved, or the main apron in the wagon bed may be moved, or both moved at the same time, by power derived from the main supporting wheels, and that the machine may be moved rearwardly over the ground surface without operating the sprocket chain 41.

The specific means by which the apron shaft 44 is rotated from the sprocket wheel 80, is as follows: Connected with the sprocket wheel 80 is a pinion 89 arranged to rotate in unison therewith. This pinion 89 is in mesh with an idler pinion 90 through which power is transmitted to the pinion 91 on the spreader shaft 114. At the opposite end of the spreader shaft 114 is a small pinion 93, which is meshed with a second idler pinion 94 mounted on the machine frame. This pinion 94 has a pitman 95 connected with it. Fixed to the shaft 44 adjacent to the pinion 94, is a ratchet wheel 96, and it is through this ratchet wheel 96 that power is usually transmitted for advancing the apron. In this connection, it should be explained that the apron is advanced through the ratchet wheel 96 when the distributing cylinder is being operated, and is in steps. At times, however, the distributing cylinder is removed and the power for operating the apron is applied solely through the sprocket chain 41, so that the apron is driven direct by power from the sprocket chain 41 when the clutch 82 and 83 is thrown in, and the apron remains idle when this clutch is thrown out of gear.

There are two different means for operating the ratchet wheel 96, the one being automatically operated by the pitman 95, and the other is manually operated through a lever.

I shall first describe the means for automatically operating this ratchet wheel 96, and regulating its movement so that it may be run either fast or slow and be made to distribute a certain predetermined number of loads per acre. This mechanism is substantially the same as that illustrated in my Patent No. 1,170,005, issued February 1, 1916, and shown specifically in Figures 1 and 2 thereof. In the accompanying drawings the ratchet device is illustrated in Figures 1 and 1ᵃ, and comprises a lever 97 fulcrumed at its central portion to a stationary pin 98. Two pawls 99 and 100 are slidingly supported in any suitable manner, and are normally in engagement with the ratchet wheel 96. Each is provided with a spring 101 for normally holding the pawl in a direction away from the ratchet wheel. The forward ends of the pawls 99 and 100 are arranged adjacent to the lever 97, and each is provided with a pin 102 to be engaged by the lever 97. Each pawl has a pin 104ᵃ adapted to coact with a limiting bar 104 to limit its movement relative thereto, and secured to the bar 104 is a rod 105 having a slot 106 through which the pin 98 passes. The forward end of the rod 105 is connected to the main operating lever in the manner hereinafter described.

The operation of this part of the device is as follows: When the pinion 94 is rotated, the pitman 95 will be reciprocated and this will cause the lever 97 to be rocked on its pivot. When the upper end of the lever 97 moves rearwardly, it will engage the pin 102 and push the pawl 99 rearwardly, thus advancing the ratchet 96 one or more ratchet tooth spaces. Then when the lever 97 is rocked in the opposite direction, its lower end will engage the pin 102 of the pawl 100, and this will force the pawl 100 rearwardly and again advance the ratchet wheel 96 one or more tooth spaces. If the limiting bar 104 is moved rearwardly from the position shown in Figure 1ᵃ, then obviously the pawls will be limited in their forward movement, that is to say, the direction in which they are pulled by their springs, and this will cause the pawls 99 and 100 to advance the ratchet wheel 96 only, say for instance, one tooth space. Then when the limiting bar 104 is moved forwardly, the movement of the pawls 99 and 100 will be less restricted and they will then be moved by the lever 97 through a sufficient length of movement to cause the ratchet wheel 96 to be advanced two or more tooth spaces at each movement.

The means for manually operating in advancing the ratchet wheel 96, comprises an arm 107 pivoted to the shaft 44 and extended downwardly, and provided at its lower end with a spring actuated pawl 108 in engagement with the ratchet wheel 96. A rod 109 is connected to the arm 107 and extended forwardly and attached to a foot lever 110, which foot lever is arranged conveniently adjacent to the driver's seat, and a spring 111 is provided for normally holding it rearwardly. By this arrangement the apron may, if desired, be advanced when the machine is standing still, or if for any reason the automatic ratchet device should fail to operate.

I shall next describe the spreading cylinder or distributer, and its supporting frame and the means whereby its movements are controlled. The spreading cylinder comprises a cylindrical body portion 112, having teeth 113 thereon, adjustably set at such angles as to throw the material both rearwardly and outwardly to give a wide spread to the material. This cylinder is fixed to a shaft 114 mounted in suitable bearings in a frame 115, which frame is provided at its top with hooks 116 designed to hook over the rear end of the main frame, as shown in Figure 4. The hook is so arranged that the frame may have a limited swinging movement in a rearward direction, and it is guided in this movement by the curved pins 117 fixed to the frame 115 and extended through openings in a part of the main frame, as shown in Figure 4. A spring 118 is secured to the frame 115 to engage the rear of the main frame to normally hold the lower end of the frame 115 slightly spaced from the main frame, far enough, at least, to hold the pinions 90 and 91 out of gear.

I have provided means for moving the lower end of the frame 115 forwardly and holding it so that the pinions 90 and 91 are in mesh with each other, as follows: On each side of the machine frame there is a latch device comprising a body portion 119 (shown in Figure 4), having a hook 120 at its rear end to engage the bottom of the frame 115. This body portion 119 is extended through a slot in the main frame, shown in Figure 4, and is capable of sliding back and forth through the slot. The latch device is also provided near its forward end with a downwardly extending shoulder 121, designed to engage a stationary stop device 122 on the main frame. At the rear end of the latch device is an upwardly projecting arm 123, to which a rod 124 is attached. Carried by the main frame and fixed to it in a stationary position, is a round stop 125 designed to serve as a guide and fulcrum for the latch device 119. It is to be understood that this latch device is not directly pivoted to any part of the main frame, but is free to move in any direction, except as it is guided by the coacting parts.

In operation, and assuming that the parts are in the position shown in Figure 4 and that it is desired to move the spreading cylinder to its operative position, then the operator pulls upon the rod 124, which has the effect of first tilting the hook 120 upwardly to engagement with the rear of the frame 115. A further pull upon the rod will then move the latch device 119 bodily in a forward direction until the shoulder 121 passes the forward edge of the shoulder 122, whereupon the latch device will drop downwardly with the shoulders 121 and 122 in engagement with each other. Then so long as the rod 124 is held in its forward position, the spreading cylinder will be operative. When, however, the rod 124 is again moved rearwardly, the arm 123 will strike upon the stop 125 and cause the hook 120 to move downwardly out of engagement with the frame 115, and then the entire latch device 119 will move rearwardly to the position shown in Figure 4.

One of the most important features of my present invention consists in the means for controlling the operations of the various parts of my machine, and I have found it very desirable to have a single lever control so arranged that the various operations of the device will be in proper sequence and in such a manner as to prevent the parts from working in opposition to each other, where such movement might tend to break the machine or interfere with its successful operation. For this purpose I have provided the main operating lever 126, fulcrumed to a stationary part of the machine frame. This lever is provided with a pawl device 127, whereby it may be locked in any suitable position, to a stationary sector 128. For convenience in description, this sector is marked in the four positions in which the lever may be set and held, as follows: First position, $a$; second position, $b$; third position, $c$; and fourth position, $d$. In this connection, it is to be noted that in the part of the sector 128 designated as position "$b$," the teeth of the sector are omitted, so that the sector may have a limited adjustment in this position.

The lever has connected with it, four controlling rods. The first one at the top is the rod 124, which controls the position of the distributer. This rod is firmly fixed to the main lever by having the two nuts 129 and 130 mounted on it and locked to opposite sides of the lever flange.

The next rod from the top is the rod 105, which controls the automatic ratchet feed for the distributing cylinder. This rod 105 extends through an opening in the lever 126, and the lever is free to move rearwardly without moving the rod, but when the said lever is moved forwardly it will engage the nuts 131 fixed to the said rod and move said rod to thereby adjust the ratchet device that controls the movement of the distributing cylinder.

The next rod from the top is the rod 88, and is the one that controls the ratchet clutch for the apron shaft. This rod has a sliding movement relative to the main lever, and is provided with nuts 132 on its forward end, so that when the lever is moved forwardly to a certain extent, it will engage said nuts and move the rod 88.

The next rod, at the bottom of the lever, is the rod 79, which controls the main clutch of the driving wheel for throwing the driving wheel into or out of operative connection with the driving sprocket 41. This rod has a sliding movement relative to the main lever, and is provided at a point in the rear of the lever with a stop device 133 adjustably fixed by the screw 134 to the rod 79. The dotted lines in Figure 8 show that when the lever is moved rearwardly to the position shown by dotted lines, the lever will strike the stop device 133 and move the rod 79 rearwardly, thus throwing the main clutch out of gear. At all other times, however, the main clutch is held in gear by the springs 66 before described.

The main lever 126 has a spring 135 attached to it to normally hold it forwardly, for purposes hereinafter made clear.

In practical operation, and assuming that the machine is being advanced over the ground either before or after it has been loaded, the main lever is moved to position shown by dotted lines in Figure 8, and the main clutch controlled by the rod 79 is thereby held out of gear so that none of the parts of the machine can be operated. Hence the machine is being advanced simply as a wagon.

Assuming that the machine has been advanced to a position where it is desired to load the wagon, then the operator manipulates the wheel 22 and lowers the cutter blade 26 to position where it will engage the ground. Then the main lever 126 is moved to position "b". When in this position, the main clutch is in gear and the driving sprocket chain 41 is being operated. The operator next manipulates the lever 35 to throw the forward apron into gear, and this will bring the material being carried by the forward apron into the forward end of the wagon bed upon the forward end of the apron. During this loading operation, which ordinarily is completed in thirty or forty seconds, the operator retains his grasp upon the main operating lever, and when the forward end of the main apron is loaded sufficiently, he pulls the main lever rearwardly to the rear end portion of the part "b" of the sector 128, thus permitting the spring actuated clutch 83 to engage the clutch of the apron driving sprocket wheel, thus rapidly moving the main apron rearwardly for a distance of a foot or two. Then the main lever is again moved forwardly, throwing the apron out of gear. During this time, the main clutch mounted on the axle 13 is in engagement and operative. This operation is repeated until the entire main apron is loaded up evenly and uniformly. If at any time during this operation of loading, the main apron should stick or if it should be desired to move it only a very small distance, the operator may at any time accomplish this purpose by simply pressing repeatedly upon the foot lever 110 to thereby advance the apron through the ratchet wheel 96. As soon as the main apron is fully loaded, the operator again moves the main lever to its rearward position, throwing the main clutch out of gear. While the main clutch is thus out of gear, the machine may be advanced to a point of discharge, and during the time it is moving to this point, the operator raises the forward end of the device far enough away from the ground by manipulating the hand wheel 22.

The load from the main apron may be discharged in three ways:

First. By moving the main lever to its position "b" and then moving it rearwardly to cause the main apron to be rapidly moved by the sprocket chain 41 in engagement with the sprocket wheel 8 clutched to the apron shaft.

Second. The main apron may be moved rearwardly for discharging through the automatic ratchet device, which will move it very slowly during the advance of the machine over the ground, to spread the material over a large area, and Third. The apron may be advanced when the machine is standing still, by having the operator move the foot lever 110. This latter is often desirable in discharging the load into deep ditches or the like.

When it is desired to discharge the material over a comparatively great area, the operator moves the main lever into its "c" position, thus throwing the distributing cylinder into position where the pinions 90 and 91 are in gear. From this position the main lever may be moved forwardly and rearwardly to any of the positions within the part of the sector marked "d" in Figure 8. When the lever is at its extreme forward position, the pawls 99 and 100 are practically unlimited in their movement, and will operate the apron relatively fast, thus distributing a comparatively great number of loads per acre, but as the main lever is moved rearwardly within this position "d", the movement of the pawls is more and more restricted and a comparatively less number of loads per acre will be distributed thereby.

During all the time that the main lever 126 is in the position "d", the clutch 83 is out of gear and the apron is driven only by the ratchet 96 and furthermore during this time, the beater is driven by the gears 89, 90 and 91. The gear 94, which operates the pitman rod 95, which in turn causes the swinging movement of the arm 97 for causing the ratchet device 96 to move, is driven by the gear 93 on the beater shaft 114. Hence any movement of the lever 126 within the portion "d" of the sector 128 does not affect the clutch 83 or the main clutch on the driving axle 13.

It should be mentioned that the mechanism of my improved device may be operated from the traction wheels or from any suitable source of power, such as an engine on the frame or otherwise, and that it may be propelled by animals or a traction engine, or may be made in the form of a self-propelling device.

I claim as my invention:

1. In a distributing wagon, the combination of a wagon bed, supporting wheels for it, a supporting and distributing apron in the wagon bed, a source of power for driving the apron in the wagon bed, and two driving means for the apron, both actuated from the said source of power, one of said driving means being directly connected to the source of power for moving the apron rapidly, and the other being indirectly connected with the source of power for moving the apron slowly.

2. In a distributing wagon, the combination of a wagon bed, supporting wheels for it, a supporting and distributing apron in the wagon bed, a source of power for driving the apron in the wagon bed, and two driving means for the apron, both actuated from the said source of power, one of said driving means being directly connected to the source of power for moving the apron rapidly, and the other being indirectly connected with the source of power for moving the apron slowly, the latter apron driving means including a ratchet device for giving the apron a step-by-step movement.

3. In a distributing wagon, the combination of a wagon bed, supporting wheels for it, a supporting and distributing apron in the wagon bed, a source of power for driving the apron in the wagon bed, two driving means for the apron, both actuated from the said source of power, one of said driving means being directly connected to the source of power for moving the apron rapidly, and the other being indirectly connected with the source of power for moving the apron slowly, a single controlling lever, and connections between the controlling lever and the apron driving means, whereby when the lever is in one position, it is freely movable to throw the direct apron driving means into or out of operation, and in another position it is locked for holding the second apron driving means in operative position, and the first apron driving means out of operative position.

4. In a distributing wagon, the combination of a wagon bed, supporting wheels for it, a supporting and distributing apron in the wagon bed, a source of power for driving the apron in the wagon bed, two driving means for the apron, both actuated from the said source of power, one of said driving means being directly connected to the source of power for moving the apron rapidly, and the other being indirectly connected with the source of power for moving the apron slowly, and a manually operated apron driving means whereby the apron may be moved to discharge when the wagon bed is standing still or the power device for driving the apron is not in operation.

5. In a distributing wagon, the combination of a wagon bed, supporting wheels for it, a supporting and distributing apron in the wagon bed, a source of power for driving the apron in the wagon bed, two driving means for the apron, both actuated from the said source of power, one of said driving means being directly connected to the source of power for moving the apron rapidly, and the other being indirectly connected with the source of power for moving the apron slowly, the latter apron driving means including a ratchet device for giving the apron a step-by-step movement, and a manually operated apron driving means whereby the apron may be moved to discharge when the wagon bed is standing still or the power device for driving the apron is not in operation.

6. In a distributing wagon, the combination of a wagon bed, supporting wheels for it a supporting and distributing apron in the wagon bed, a source of power for driving the apron in the wagon bed, two driving means for the apron, both actuated from the said source of power, one of said driving means being directly connected to the source of power for moving the apron rapidly, and the other being indirectly connected with the source of power for moving the apron slowly, a single controlling lever, connections between the controlling lever and the apron driving means, whereby when the lever is in one position it is freely movable to throw the direct apron driving means into or out of operation, and in another position it is locked for holding the second apron driving means in operative position, and the first apron driving means out of operative position.

7. In a distributing wagon, the combination of a wagon bed, supporting wheels for it, a supporting and distributing apron in the wagon bed, a source of power for driving the apron in the wagon bed, two driving means for the apron, both actuated from the said source of power, one of said driving means being directly connected to the source of power for moving the apron rapidly, and the other being indirectly connected with the source of power for moving the apron slowly, and a manually operated ratchet device independent of the other apron driving means, whereby the apron may be slowly moved to discharge when the wagon is stationary or the apron driving power device is inoperative.

8. In a distributing wagon, the combination of a wagon bed, supporting wheels for it, a supporting and distributing apron in the wagon bed, a source of power for driving the apron in the wagon bed, two driving means for the apron, both actuated from the said source of power, one of said driving means being directly connected to the source of power for moving the apron rapidly, and the other being indirectly connected with the source of power for moving the apron slowly, the latter apron driving means including a ratchet device for giving the apron a step-by-step movement, and a manually operated ratchet device independent of the other apron driving means, whereby the apron may be slowly moved to discharge when the wagon is stationary or the apron driving power device is inoperative.

9. In a distributing wagon, the combination of a wagon bed, supporting wheels for it, a supporting and distributing apron in the wagon bed, a source of power for driving the apron in the wagon bed, two driving means for the apron, both actuated from the said source of power, one of said driving means being directly connected to the source of power for moving the apron rapidly, and the other being indirectly connected with the source of power for moving the apron slowly, a single controlling lever, connections between the controlling lever and the apron driving means, whereby when the lever is in one position it is freely movable to throw the direct apron driving means into or out of operation, and in another position it is locked for holding the second apron driving means in operative position, and the first apron driving means out of operative position, and a manually operated ratchet device independent of the other apron driving means, whereby the apron may be slowly moved to discharge when the wagon is stationary or the apron driving power device is inoperative.

10. In a distributing wagon, the combination of a wagon bed, supporting wheels for it, a conveying and supporting apron in the wagon bed, means for establishing a direct connection between one of the supporting wheels and the apron for driving the apron rapidly, means for establishing an indirect connection between one of the supporting wheels and the apron, for driving it slowly by power from the supporting wheel, and a manually operated means for driving the apron when the wagon is standing still.

11. In a device of the class described, the combination of a wagon bed, supporting wheels for said bed, a main supporting and delivering apron in said wagon, an elevating conveyor at the front of the wagon bed, a distributing device at the rear of the wagon bed, a driving means for said conveyor and distributing devices, gearing devices between said driving means and the said conveying and distributing devices and means for controlling said gearing devices whereby the elevating conveyor may be driven at one speed, the main supporting and delivering apron driven at a lesser speed and thrown into or out of gear at will of operator, without affecting the action of the elevating conveyor, and also whereby the distributing device at the rear may be operated and the speed of the distributing apron may be varied relative to its speed when operating jointly with the elevating conveyor.

12. In a self-loading and distributing wagon, the combination of a wagon bed, supporting wheels for it, a main supporting and delivering apron in the wagon bed, an elevating conveyor at the front of the wagon bed, a distributing device at the rear of the supporting and conveying apron, a driving means whereby the elevating conveyor, supporting and delivering conveyor and the spreader may be driven by power from one of the supporting wheels, a clutch device whereby said supporting wheel may be operatively connected or disconnected to the driving means, a single controlling lever, and connections between the controlling lever and the apron driving means and the spreader driving means, whereby in one position both the apron and the elevating conveyor may be operated and the spreader be retained in an inoperative position, and in another position the apron, the elevating conveyor and the spreader may all be operated.

13. In a self-loading and distributing wagon, the combination of a wagon bed, supporting wheels for it, a main supporting and delivering apron in the wagon bed, an elevating conveyor at the front of the wagon bed, a distributing device at the rear of the supporting and conveying apron, a driving means whereby the elevating conveyor, supporting and delivering conveyor and the spreader may be driven by power from one of the supporting wheels, a clutch device whereby said supporting wheel may be operatively connected or disconnected to the driving means, a single controlling lever, connections between the controlling lever and the apron driving means and the spreader driving means, whereby in one position both the apron and the elevating conveyor may be operated and the spreader be retained in an inoperative position, and in another position the apron, the elevating conveyor and the spreader may all be operated, and a second lever for operatively connecting or disconnecting the elevating conveyor with the said driving means.

14. In a self-loading and distributing wagon, the combination of a wagon bed, supporting wheels for it, a driving sprocket wheel adjacent one of the supporting wheels, a clutch for operatively connecting or disconnecting the driving sprocket wheel with the supporting wheel, a forward elevating conveyor, a spreader, a sprocket chain connecting the driving sprocket wheel with the forward elevating conveyer and with the spreader, a lever for controlling the said clutch, and a ratchet device interposed between the supporting wheel and the driving sprocket wheel, whereby a rearward movement of the supporting wheel will not operate the said sprocket wheel.

15. In a self-loading and distributing wagon, the combination of a wagon bed, supporting wheels for said bed, a supporting and delivering apron in the wagon bed, an elevating conveyor at one end of the wagon bed, a distributing device at the other end of said bed, and an operating mechanism whereby the apron may be driven at a certain speed simultaneously with the elevating conveyor, and whereby the apron may be driven at another speed simultaneously with the distributing device.

16. In a distributing wagon, the combination of a wagon bed, supporting wheels for it, a supporting and delivering apron in the wagon bed, a driving sprocket wheel, a clutch device for operatively connecting or disconnecting it with the supporting wheel, a sprocket wheel loosely mounted on the apron shaft, a sprocket chain for connecting the two sprocket wheels, a clutch device for operatively connecting or disconnecting the sprocket wheel with the apron shaft, and a single controlling lever capable in one position of holding the clutch for the driving sprocket in an inoperative position, and also capable in another position of holding the clutch for the sprocket on the apron shaft in an inoperative position.

17. In a distributing wagon, the combination of a wagon bed, supporting wheels for it, a supporting and delivering apron in the wagon bed, a driving sprocket wheel, a clutch device for operatively connecting or disconnecting it with the supporting wheel, a sprocket wheel loosely mounted on the apron shaft, a sprocket chain for connecting the two sprocket wheels, a clutch device for operatively connecting or disconnecting the sprocket wheel with the apron shaft, a ratchet driving mechanism for the apron shaft, means for connecting it with the sprocket wheel on the apron shaft, and a single controlling lever capable in one position of holding the driving sprocket clutch out of gear, and in a second position of holding both of said clutches in gear, and in a third position capable of holding the driving sprocket clutch and the clutch for the apron sprocket out of gear, so that the ratchet driving device for the apron may be operated from the driving sprocket wheel, and also so that the sprocket wheel for the apron shaft will be operatively disconnected from the apron shaft.

18. In a distributing wagon, the combination of a wagon bed, supporting wheels for it, a supporting and delivering apron in the wagon bed, a driving sprocket wheel, a clutch for operatively connecting or disconnecting it with a supporting wheel, a sprocket wheel loosely mounted on the apron shaft, a clutch for operatively connecting or disconnecting it with the apron shaft, a spreader mounted on the wagon bed, a ratchet driving device for the apron, means for establishing a driving connection between the apron sprocket wheel and the ratchet driving device for the apron when the spreader is operatively connected with the sprocket wheel of the apron, a single controlling lever, and connections between the controlling lever and the driving sprocket, the apron shaft sprocket and the spreader, said controlling lever and connections being so arranged that in one position of the lever the driving sprocket is held inoperative, in another position both the driving sprocket and the apron sprocket are operatively connected to directly drive the apron, and in a third position the driving sprocket is held in its operative position, the apron sprocket is operatively disconnected from the apron shaft, and the spreader and the ratchet driving mechanism for the apron are held in their operative positions for simultaneously driving the apron through the ratchet device and also operating the spreader.

19. In a distributing wagon, the combination of a wagon bed, supporting wheels for it, a supporting and conveying apron in the wagon bed, a driving sprocket wheel, a clutch for operatively connecting or disconnecting it with the supporting wheel, a sprocket wheel loosely mounted on the apron shaft, a sprocket chain for connecting it with the driving sprocket wheel, a clutch on the apron shaft for operatively connecting or disconnecting the sprocket wheel therewith, a ratchet driving means for the apron shaft, a spreader gearing mechanism carried by the spreader and so arranged that when the spreader is moved forwardly it will be operatively connected with the sprocket wheel of the apron shaft, and at the same time the ratchet driving mechanism for the apron will be operatively connected with the apron driving sprocket wheel, a single controlling lever, and connections between the said controlling lever, the two said clutches and the spreader, said lever and its connections being so arranged that when the lever is in its rearward position the clutch for the driving sprocket will be out of gear, when in an intermediate position the clutch for the driving shaft will be in gear and the clutch for the apron shaft may be moved either into or out of gear, and in a third position the clutch for the driving sprocket will be in gear and the spreader will be moved to position where it is operatively connected with the driving sprocket for the apron and also driving means for the ratchet driving device, and at the same time the clutch for the apron sprocket will be in an inoperative position.

20. In a distributing wagon, the combination of a wagon bed, supporting wheels for it, a supporting and conveying apron in the wagon bed, a driving sprocket wheel, a clutch for operatively connecting or disconnecting it with the supporting wheel, a sprocket wheel loosely mounted on the apron shaft, a sprocket chain for connecting it with the driving sprocket wheel, a clutch on the apron shaft for operatively connecting or disconnecting the sprocket wheel therewith, a ratchet driving means for the apron shaft, a spreader gearing mechanism carried by the spreader and so arranged that when the spreader is moved forwardly it will be operatively connected with the sprocket wheel of the apron shaft, and at the same time the ratchet driving mechanism for the apron will be operatively connected with the apron driving sprocket wheel, a single controlling lever, connections between the said controlling lever, the two said clutches and the spreader, said lever and its connections being so arranged that when the lever is in its rearward position the clutch for the driving sprocket will be out of gear, when in an intermediate position the clutch for the driving shaft will be in gear and the clutch for the apron shaft may be moved either into or out of gear, and in a third position the clutch for the driving sprocket will be in gear and the spreader will be moved to position where it is operatively connected with the driving sprocket for the apron and also driving means for the ratchet driving device, and at the same time the clutch for the apron sprocket will be in an inoperative position, and a means for regulating the ratchet drive device, said means being operatively connected with the main controlling lever and so arranged that when the main controlling lever is in any position in advance of the position for throwing the spreader into gear, the speed of the ratchet driving device may be thereby controlled.

21. In a distributing wagon, the combination of a wagon bed, supporting wheels for it, a supporting and delivering apron in the wagon bed, a driving pinion on the apron shaft, a spreader frame hingedly supported on the wagon bed, a spreader therein, a pinion on the spreader shaft, and means for moving the hinged spreader frame forwardly to position for establishing a driving connection between the said pinions on the apron shaft and on the spreader shaft.

22. In a distributing wagon, the combination of a wagon bed, supporting wheels for it, a supporting and delivering apron in the wagon bed, a driving pinion on the apron shaft, a spreader frame hingedly supported on the wagon bed, a spreader therein, a pinion on the spreader shaft, means for moving the hinged spreader frame forwardly to position for establishing a driving connection between the said pinions on the apron shaft and on the spreader shaft, and a spring for yieldingly holding the spreader frame rearwardly to disconnect said pinions.

23. In a distributing wagon, the combination of a wagon bed, supporting wheels for it, a supporting and delivering apron in the wagon bed, a driving pinion on the apron shaft, a spreader frame hingedly supported on the wagon bed, a spreader therein, a pinion on the spreader shaft, means for moving the hinged spreader frame forwardly to position for establishing a driving connection between the said pinions on the apron shaft and on the spreader shaft, a ratchet driving mechanism for the apron shaft, and means for operating said ratchet driving mechanism through the said spreader, whereby said ratchet driving device can be operated only when the spreader is moved to its operative position.

24. In a distributing wagon, the combination of a wagon bed, supporting wheels for it, a supporting and delivering apron in the wagon bed, means for driving the apron, and a locking device for preventing rearward movement of the apron when the apron driving mechanism is out of gear.

25. In a distributing wagon, the combination of a wagon bed, supporting wheels for it, a supporting and delivering apron in the wagon bed, means for driving the apron, and a locking device for preventing rearward movement of the apron when the apron driving mechanism is out of gear, said means comprising a hinged collar keyed to the apron shaft, a pawl pivoted to one of the apron sprockets, said pawl being provided with a lug to enter the hinged disc, and a stationary ratchet in position to be engaged by said pawl, said parts being so arranged that when the shaft is being driven in unison with the sprocket wheel, the pawl will remain out of engagement with the ratchet but when the sprocket wheel is moved independently of the notched disc the pawl will engage the ratchet and prevent movement of the apron.

Des Moines, Iowa, July 9, 1917.

ROBERT SHEDENHELM.